United States Patent
McMurtry

(10) Patent No.: US 6,918,188 B2
(45) Date of Patent: *Jul. 19, 2005

(54) PERFORMING MEASUREMENT OR CALIBRATION ON POSITIONING MACHINES

(75) Inventor: David R. McMurtry, Wotton-Under-Edge (GB)

(73) Assignee: Renishaw PLC, Gloucestershire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/462,606

(22) Filed: Jun. 17, 2003

(65) Prior Publication Data

US 2003/0209051 A1 Nov. 13, 2003

Related U.S. Application Data

(63) Continuation of application No. 10/261,410, filed on Oct. 2, 2002, now Pat. No. 6,662,461, which is a continuation of application No. 09/803,917, filed on Mar. 13, 2001, now abandoned, which is a division of application No. 08/886,062, filed on Jul. 3, 1997, now Pat. No. 6,226,884, which is a continuation of application No. 08/530,247, filed on Oct. 30, 1995, now Pat. No. 5,681,981.

(30) Foreign Application Priority Data

Jan. 28, 1994 (GB) ............................................ 9401692

(51) Int. Cl.[7] ............................................. G01B 5/008
(52) U.S. Cl. ..................................................... 33/558.2
(58) Field of Search ............................. 73/865.8–865.9, 73/1.79; 33/558.2, 557–558, 558.02, 559–561, 502–503

(56) References Cited

U.S. PATENT DOCUMENTS

| 4,197,652 A | 4/1980 | Ournell et al. ................. 35/502 |
|---|---|---|
| 4,397,188 A | 8/1983 | Bansevichus et al. ......... 73/651 |
| 4,435,905 A | 3/1984 | Bryan ........................ 318/687 |
| 4,492,036 A | 1/1985 | Beckwith, Jr. ............... 33/503 |
| 4,536,690 A | 8/1985 | Belsterling et al. ......... 318/687 |
| 4,819,496 A | 4/1989 | Shelef ........................ 74/479 |
| 4,829,677 A | 5/1989 | Yuzuru ....................... 33/561 |
| 4,962,591 A | 10/1990 | Zeller et al. |
| 4,982,504 A | 1/1991 | Soderberg et al. |
| 4,988,244 A | 1/1991 | Sheldon et al. ............. 409/132 |

(Continued)

FOREIGN PATENT DOCUMENTS

| DE | 35 04 464 | 4/1986 | .................. 33/700 |
|---|---|---|---|
| DE | 3506892 A1 | 9/1986 | .................. 33/558 |
| EP | 0 534 585 | 3/1993 | .................. 269/46 |
| GB | 2 083 795 B | 1/1984 | ................. 414/589 |
| RU | 1222 538 A | 4/1986 | |
| RU | 1753238 | 8/1992 | |
| WO | 91/03145 | 3/1991 | |
| WO | 92/17313 | 10/1992 | |
| WO | 95/14905 | 6/1995 | |

Primary Examiner—Thomas P. Noland
(74) Attorney, Agent, or Firm—Oliff & Berridge, PLC

(57) ABSTRACT

Apparatus which can be used to calibrate, or provide measurement data on, a machine. The apparatus comprises two structures each with three spherical supports spaced in a triangular array thereon. The supports may be balls or sockets. The structures are interconnected by six members and each support has the ends of two members connected to it. The members are passive extensible measuring bars and the structures are respectively connected to fixed and movable parts of a machine so that movement of the machine parts causes relative movement between the structures and varies the lengths of the measuring bars. From measurements of the lengths of the measuring bars the actual movement of the machine part can be determined. Calibration of the spherical supports is carried out using a measuring bar which is pre-calibrated in a Zerodur jig.

8 Claims, 7 Drawing Sheets

U.S. PATENT DOCUMENTS

| | | | |
|---|---|---|---|
| 5,014,444 A | 5/1991 | Breyer | 33/502 X |
| 5,028,180 A | 7/1991 | Sheldon et al. | 409/201 |
| 5,029,398 A * | 7/1991 | Ertl | 33/503 |
| 5,063,683 A | 11/1991 | Bury | 33/503 X |
| 5,179,525 A | 1/1993 | Griffis et al. | |
| 5,187,874 A | 2/1993 | Takahashi et al. | 73/1.79 X |
| 5,214,857 A | 6/1993 | McMurtry et al. | |
| 5,247,749 A | 9/1993 | Bury | 33/503 |
| 5,257,460 A | 11/1993 | McMurtry | 33/502 |
| 5,259,710 A | 11/1993 | Charles | |
| 5,269,067 A | 12/1993 | Waeldele et al. | |
| 5,341,574 A | 8/1994 | Bieg | |
| 5,347,842 A | 9/1994 | Pottinger et al. | 73/1.01 |
| 5,400,638 A | 3/1995 | Kim | 73/1.79 |
| 5,401,128 A | 3/1995 | Lindem et al. | 409/132 |
| 5,434,803 A | 7/1995 | Yoshida | 33/503 X |
| 5,501,096 A | 3/1996 | Stettner et al. | 73/1.79 |
| 6,336,325 B1 * | 1/2002 | Gluck et al. | 33/503 X |
| 6,681,495 B2 * | 1/2004 | Masayuki et al. | 33/502 X |
| 2004/0003647 A1 * | 1/2004 | Nashiki et al. | 73/1.79 |

* cited by examiner

PERFORMING MEASUREMENT OR CALIBRATION ON POSITIONING MACHINES

This is a Continuation Application of Application No. 10/261,410, filed Oct. 2, 2002 and now abandoned, now U.S. Pat. No. 6,662,461, which is a Continuation Application of Application No. 09/803,917, filed Mar. 13, 2001 which is a Division of Application No. 08/886,062, filed Jul. 3, 1997, and now Pat. No. 6,226,884, which in turn is a Rule 60 Continuation Application of U.S. patent application Ser. No. 08/530,247, filed Oct. 30, 1995, and now Pat. No. 5,681,981, which in turn is a U.S. National Stage filing under 35 U.S.C.§371 of International Application No. PCT/GB95/00169, filed Jan. 27, 1995. The entire disclosures of the prior applications are hereby incorporated by reference herein in their entirety.

BACKGROUND OF THE INVENTION

This invention relates to machines in which one member is positioned relative to another. For example, it relates to coordinate measuring machines, machine tools, scanning machines and robots, in which a tool or probe is positioned relative to a workpiece.

More particularly, the invention relates to performing measurements or calibration on such machines.

In some aspects, the present invention is a development of the apparatus and methods described in our International Patent Application No. PCT/GB94/02593, published as W095/14905, to which reference should be made. Reference is also directed to the apparatus and methods described in International Patent Applications Nos. W091/03145 (Kearney & Trecker) and WO92/17313 (Geodetic Machines), and in European Patent Application No. 534585 (Ingersoll).

All the above applications show machines in which a tool, probe or other operator is mounted on one structure, for movement relative to another structure upon which a workpiece may be mounted. The tool, probe or other operator may be movable and the workpiece fixed, or vice versa. The relative movement is effected by six rams acting between the two structures. These rams can be controlled so as to produce any desired relative movement between the structure, with six degrees of freedom (three translational and three rotational). It is necessary to measure the movements of the rams, and one aspect of the present invention is concerned with such measurement.

A problem with the apparatus described in the various above-referenced patent applications is that of calibrating the movement of the machine. To achieve this, it is necessary to measure the relative position and orientation of the moving structure relative to the fixed structure, independently of the measurements of the extensions of the rams which produced that position and orientation. Another aspect of the present invention allows such calibration, both on the type of machine described in the above patent applications, and on more conventional machines.

SUMMARY OF THE INVENTION

According to one aspect of the present invention a method of calibrating a machine comprises the steps of attaching a first structure to one part of a machine, said structure having at least one spherical or part-spherical support thereon, attaching a second structure to a second part of a machine, said structure having three spherical, or part-spherical supports thereon arranged in a triangular pattern, interconnecting the two structures by at least three measuring bars each of which is attached to one of the supports on each structure, producing relative movement between the two parts of the machine thereby causing relative movement between the two structures, determining the changes in the lengths of the measuring bars caused by the relative movement of the two structures, and determining from such length changes the actual movements of the two structures.

According to one embodiment of the invention the first structure has three spherical or part-spherical supports thereon which are arranged in a triangular pattern, six measuring bars are provided, opposite ends of each bar being connected to one support on each structure. In such an embodiment, each support on both structures has the ends of two measuring bars connected to it.

According to another embodiment of the invention, the first structure comprises a single support disposed on the machine at the position which would normally be occupied by the tip of a tool or a measuring probe, three measuring bars are provided, opposite ends of each bar being connected to the single support on the first structure, and to one of the supports on the second structure.

According to another aspect of the invention there is provided apparatus comprising a first structure having at least one spherical or part-spherical support thereon, a second structure which has three spherical or part-spherical supports spaced in a triangular pattern thereon, and at least three members interconnecting the two structures.

The apparatus may be connected to a machine as a calibration device in which case the members may be passive measuring bars, or alternatively the members may be powered extensible struts capable of manipulating one of the structures relative to the other.

In one embodiment of the invention both of the structures have three spherical or part-spherical supports spaced in a triangular pattern thereon, and six members are provided, each of which is connected at one of its ends to a support on one of the structures and at the other of its ends to a support on the other one of the structures. In such an embodiment each support on both structures has the ends of two members connected to it.

The powered struts may also incorporate measuring devices so that they additionally act as measuring bars for determining the relative movements of the two structures.

In any one of the above-described embodiments of any of the aspects of the invention, the supports may take the form of spheres or part-spheres, or of spherical or part-spherical sockets. The supported ends of the measuring bars or struts may therefore be provided with correspondingly shaped balls or sockets at either end as appropriate, which may be completely spherical or only part-spherical, in order to fit on the supports.

The measuring bars or struts may extend between the supports and be telescopic or extensible in some other way, or may be of fixed length and extend through, or carry extensions which extend through, the supports so as to provide a greater range of relative movement for the structures.

The struts may be powered by internal or external drive means as known per se.

According to one novel feature of the invention, the supported end of a measuring bar or strut lies at an angle to the longitudinal axis of the strut, whereby, when in position on the support, the axis of the strut is aligned with the centre of the support.

The measuring bars or struts may be attached to the supports in any convenient manner, but a preferred form of attachment is by means of magnetic attraction.

BRIEF DESCRIPTION OF THE DRAWINGS

Preferred embodiments of the invention will now be described with reference to the accompanying drawings, wherein.

DETAILED DESCRIPTION OF PREFERRED EMBODIMENTS

Figure 1:
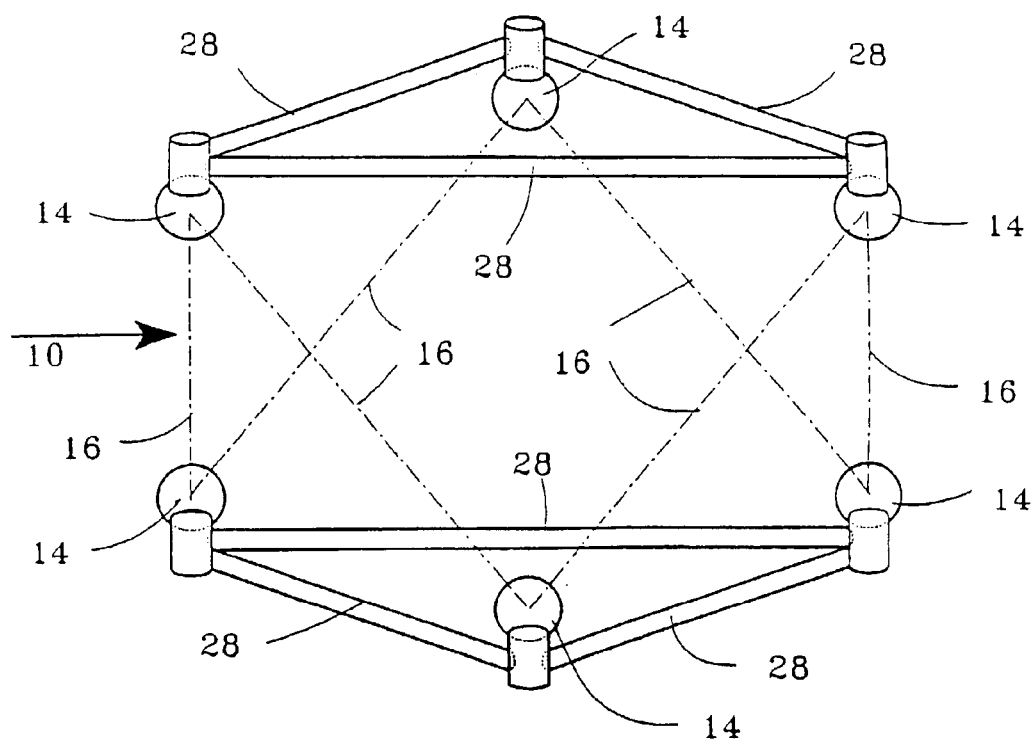
FIG. 1 is a simplified isometric view of a preferred embodiment of measurement or calibration apparatus.

FIG. 1 shows a device which can be used for calibration. It comprises an upper structure in the form of an open triangular frame 10 and a lower structure in the form of an open triangular frame 12. Each frame is provided with three precision steel balls 14, one at each corner of the triangle. In use, the upper frame 10 is clamped to the moving structure of a machine, while the lower frame is clamped to the fixed structure (or vice versa). The device may be used with conventional machine tools or with the types of machines illustrated in the above-referenced International and European applications.

Figure 3:
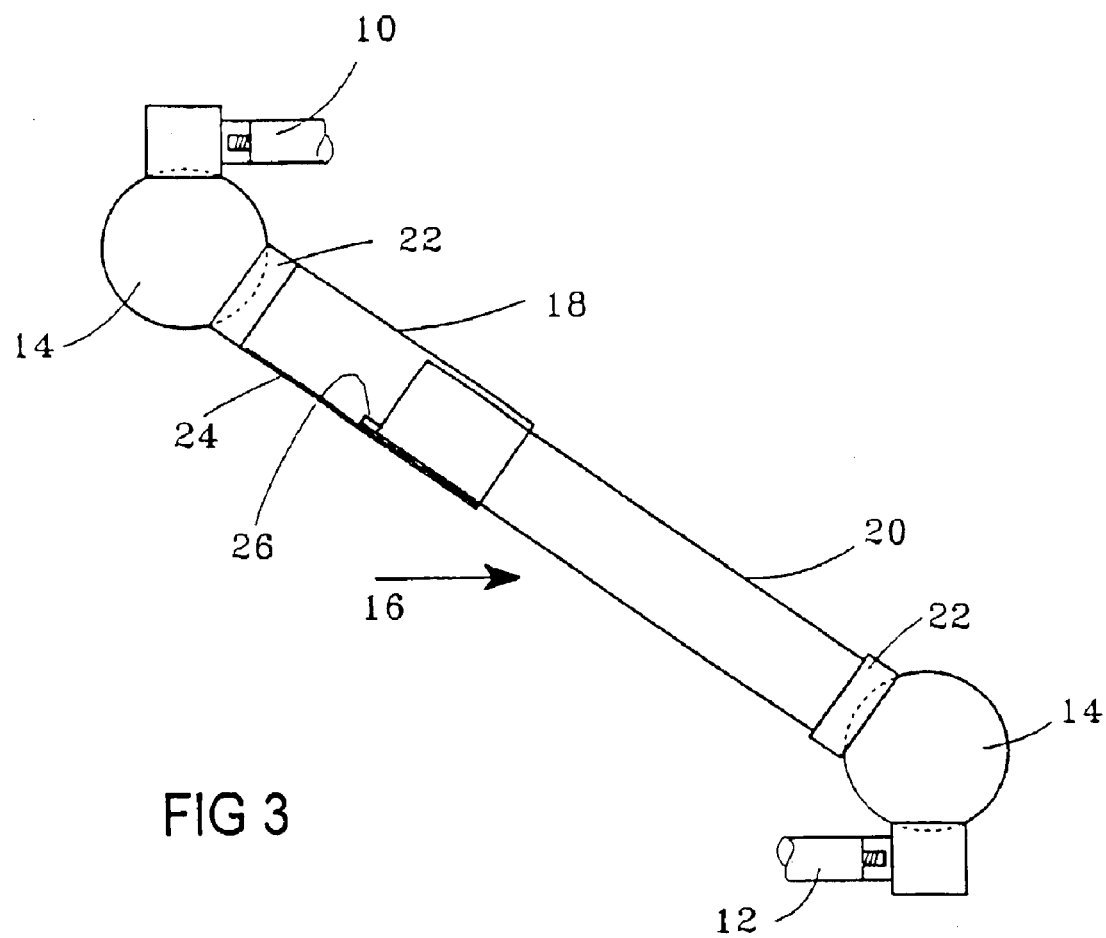
FIG. 3 is a more detailed side view of another part of the apparatus of FIG. 1.

The spheres 14 are linked in use by six members which in this embodiment are passive measuring bars 16. The positions of these are shown merely by broken lines in FIG. 1, but more detail is seen in FIG. 3. Each measuring bar 16 in this example comprises parts 18,20 which interfit telescopically and extend between the spheres, but may take the form of rigid links which pass through the spheres as described in later embodiments. At each end, there is provided a magnetic socket 22, which holds the bar 16 in a universally pivotable manner to a respective one of the balls 14. The length of the bar 16 at any given time is therefore an accurate measure of the distance between the balls 14. This length is measured by any convenient transducer system, for example a scale 24 within the member 18, over which passes a readhead 26 attached to the member 20.

The magnetic sockets 22 are of a type which is known, and commonly used in ball bars which are used for calibrating machines tools and other positioning machines. They contain a trihedral support into which the ball 14 is drawn by a magnet. Given that the ball 14 is accurately spherical, the connection between the ball and the bar 16 is thus defined kinematically with great precision. The magnetic sockets 22 are described in, for example, U.S. Pat. No. 4,435,905 (Bryan) and in "A Simple Method For Testing Measuring Machines and Machine Tools" by J. B. Bryan, Precision Engineering, Vol 4, No. 2, Apr. 1982, pages 61–69 and No. 3, Jul. 1982, pages 125–138. The magnetic sockets are not essential and other forms of connection may be used.

In use, the triangular frames 10,12 are clamped to the fixed and moving parts of the machine by any convenient means, and the six measuring bars 16 are placed between the respective balls 14. The machine is now exercised so as to move the moving part to a number of different positions and orientations relative to the fixed part. As this happens, a computer as shown at 121 in FIG. 11 acquires data from the transducers in each of the measuring bars 16. Using known algorithms, this data is used to determine the precise position and orientation to which the machine has been moved, and thus to calibrate its motion. For example, it is possible to build up an error map showing the true position and orientation of the moving part of the machine for any given demanded position as shown by its own measuring devices.

Figure 2:
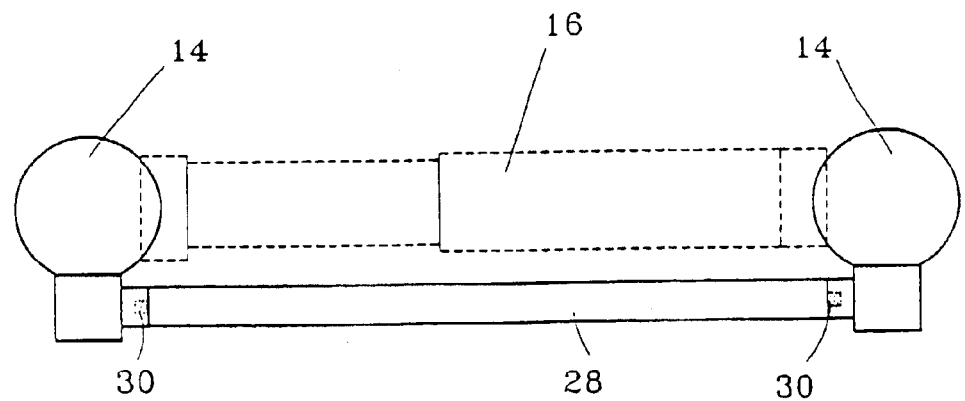
FIG. 2 is a side view of part of the apparatus of FIG. 1.

The upper and lower triangular frames 10,12 may each be built as a single unit if desired. However, for convenience, we prefer that it should be of modular construction, made up from a kit of parts which can be dismantled for portability. As seen in FIGS. 1 and 2, therefore, each frame may be made up of three rods 28, with a screw connection 30 at each end for attachment to the ball 14. If desired, the kit of parts for making the apparatus of the present invention may include a selection of rods 28 of different lengths, for use on machines of different sizes of course, the frames 10,12 may also have various clamping features to facilitate clamping to the machine, but these are not shown.

The algorithms used to determine the position and orientation of the machine from the lengths of the measuring bars 16 require that the distances between adjacent balls 14 on each of the frames 10,12 should be known. These distances may be determined using one of the measuring bars 16 itself, as shown in broken lines in FIG. 2. A total of six such measurements are required before the calibration procedure is carried out, three between adjacent pairs of balls on the frame 10, and three between adjacent pairs of balls on the frame 12.

The kit of parts may also include a calibration block so that the measuring bars 16 can be calibrated before use. Such a calibration block has two precision steel balls, like the balls 14, connected together at a known spacing. This known spacing may be separately calibrated to a traceable standard. The balls of the calibration block may be connected together by a bar of a material having a low or zero coefficient of thermal expansion, such as INVAR®, or ZERODUR®. This ensures that the known spacing between the balls does not change with temperature.

Since each ball 14 of the frames 10,12 must receive the magnetic sockets of two of the measuring bars 16, it is necessary to ensure that they do not foul each other during movement. With a measuring bar as shown in FIG. 3, it may be necessary to use balls 14 which have a somewhat larger diameter than the magnetic sockets 22, so that two such sockets can fit on one ball simultaneously.

Figure 4:
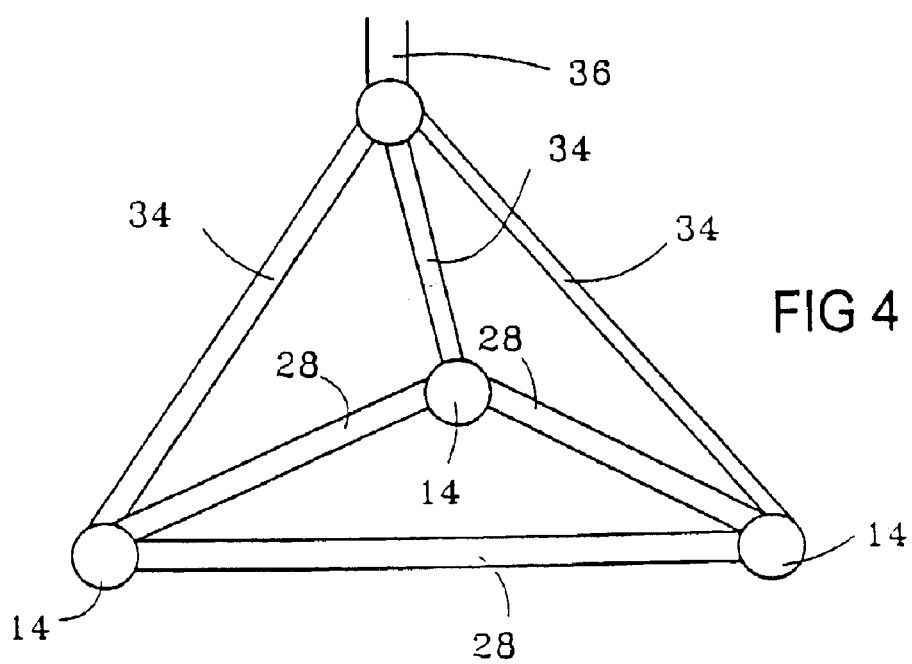
FIG. 4 is a schematic perspective view of a modification of part of FIG. 1.

The invention is not restricted to calibrating machines of the type shown in the above-mentioned earlier patent applications. It can equally be used for calibrating a conventional machine tool, coordinate measuring machine, robot, etc. Such conventional machines generally involve a plurality of axes, arranged in series with each other. For example, a five axis machine tool or coordinate measuring machine may involve three slide axes, X, Y, Z, plus two axes of rotation, A and B. The present apparatus may be used to calibrate such a machine by connecting the upper frame 10 to the spindle or quill of the machine, and the lower frame 12 to the table or workpiece holder of the machine. FIG. 4 illustrates schematically one way in which the upper frame 10 might be adapted to enable it to be easily fitted in a spindle or quill of such a machine. In addition to the six frame members 28, it also has three further links 34, in the form of a tetrahedron. At the apex of the tetrahedron, there is provided a spigot 36 for fitting in the machine's quill or spindle. This spigot may if desired be in the form of a standard taper shank as usually used for fitting tools into the spindle of a machine tool.

The apparatus described is not restricted to use for calibrating machines. It can be installed permanently on a machine, forming the means by which the position and orientation of the moving part of the machine is measured, in order to provide position feedback data for the servo control of the machine's movement. For example, it may replace the extensible instrument arms described in WO91/03145. The six measuring bars 16 of the present apparatus may also be mounted (on balls 14), parallel with the six rams 18 described in our International Patent Application No. PCT/GB94/02593. They then replace the interferometers or other devices described in that application for measuring the machine's movement.

Figure 6:
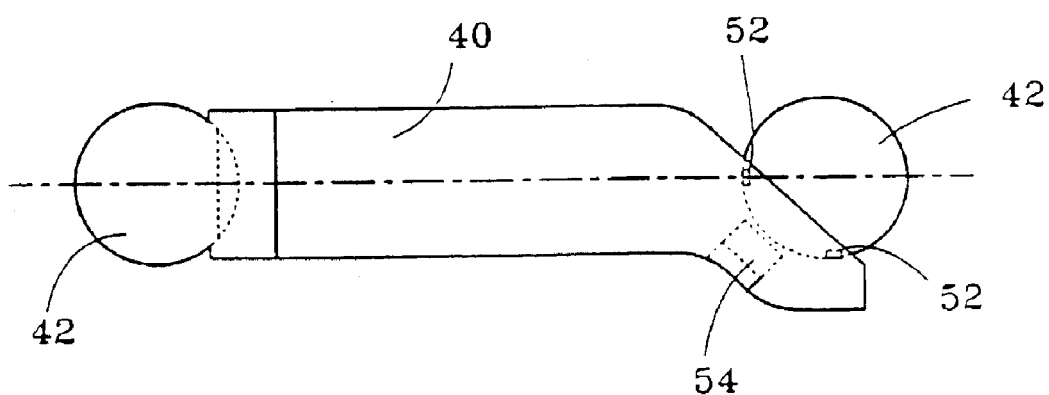
FIG. 6 is a detail of one of the ball and socket joints showing a modified socket.

Another possibility is for the upper frame 10 to form part of (or to be clamped to) a special metrology frame, which is separate from the moving part of the machine, but connected to it so as to undergo the same motions as the tool or probe. An example of such a separate metrology frame is shown in FIG. 6 of our earlier International Patent Application No. PCT/GB94/02593. Instead of the upper frame 10 of FIG. 1 of the present application, the three balls 14 are simply connected at three spaced locations on the metrology frame 68 shown in FIG. 6 of the earlier application which thus forms the structure. If the measuring bars 16 of the present application are intended to form the permanent measuring devices for the machine, then the balls 14 of the present application will simply be connected in place of the retroreflectors 66 of the interferometers shown in FIG. 6 of that earlier application.

Figure 5:
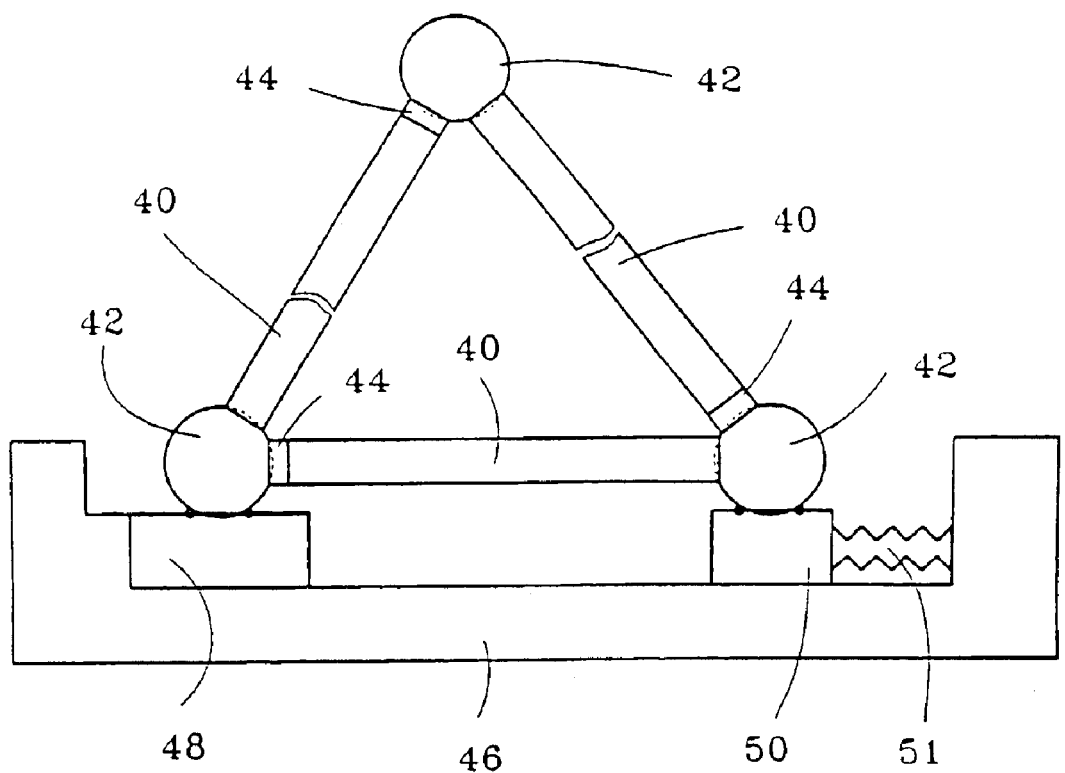
FIG. 5 shows part of an alternative embodiment of the measurement or calibration apparatus of the invention.

As an alternative to the triangular frames 10 and 12 shown in FIG. 1, there is shown in FIG. 5 a frame which consists of three rigid rods 40, each of which has a ball 42 permanently attached at one end and a magnetic socket 44 at the other end.

Other arrangements are possible in the construction of the triangular frames 10 and 12. For example the kit of parts described with reference to FIG. 1 may consist of six balls, six rigid rods and six measuring bars. The rods and measuring bars terminate in magnetic sockets as described so that they will snap onto the balls. The six rigid rods are arranged to form two rigid triangular frames for the top and bottom of the apparatus and the measuring bars are connected between the triangular frames.

Clearly the balls and sockets can be interchanged in other embodiments while still providing the rigid triangular frames interconnected by measuring bars.

In FIG. 5 the triangular frame is illustrated in place in a calibration jig 46 for determining the spacing of the balls. The jig, which may be made from ZERODUR™ or INVAR™, includes one fixed socket 48 at one end and a movable socket 50 at the other end. The distance between the centres of the sockets gives a measure of the distance between the centres of the balls 42. This distance may be measured by a telescoping sensing device, for example an LVDT, as shown at 51, or a retroreflector may be mounted on the movable socket to reflect a light beam from a laser interferometer system (not shown) mounted on the fixed socket to measure the distance between the balls interferometrically.

In the assembled metrology frame the magnetic sockets of the measuring bars 16 are attached to the balls 42.

It is preferable that the axes of the rods and measuring bars should pass through the centres of the balls 42. In order to accommodate this feature where three or more attachments are to be made to one ball, one or more of the sockets on any arm, or on the rods, may be arranged at an angle to the axis of the rod or arm as shown in FIG. 6.

One of the rods 40 is shown in FIG. 6 attached to a ball 42. Each socket has three pads 52 which make contact with the surface of the ball 42. One of the pads lies on the axis of the rod and thus contacts the ball on the line of the axis through the centre of the ball 42. The other two contact points lie preferably just over the orthogonal centre lines of the ball from the first. A magnet 54 is set into the socket to hold the socket in position on the ball.

The use of magnetically retained sockets in the two triangular frames 10,12 makes them easy to dismantle for portability of the frame. Sockets as described with reference to FIG. 6 can be provided at both ends of the rods.

It is not however, essential that the structures are formed as assemblies of rods and balls. A solid or hollow triangular structure could be provided with balls or part-spherical sockets at its apices.

Figure 7:
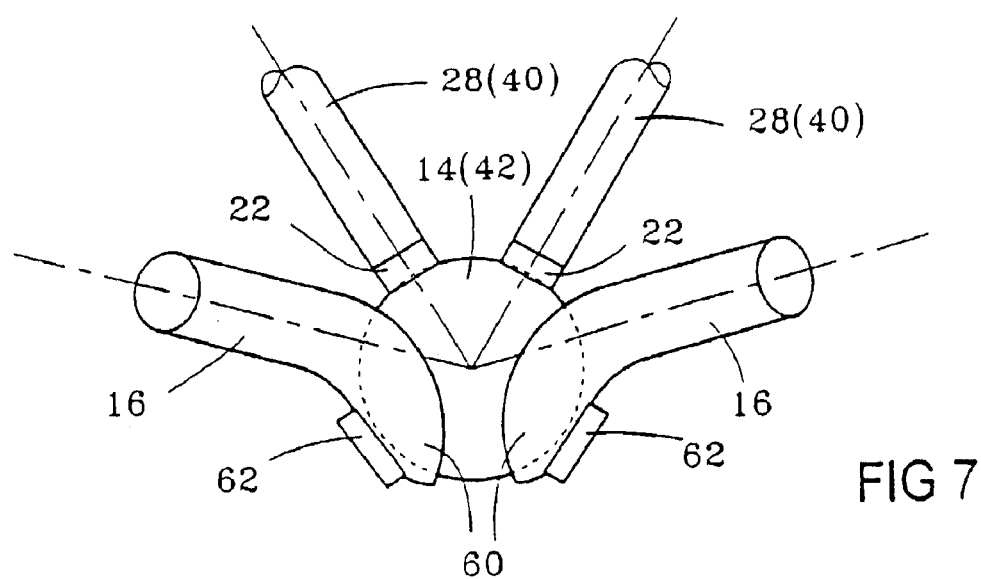
FIG. 7 shows one way of attaching the ends of four struts to a single ball of the apparatus of the invention.

FIG. 7 shows one arrangement of rods 28,(40) and measuring bars 16 of the above-described embodiments which enables two rods and two measuring bars to terminate on a single one of the balls 14,(42).

It can be seen that each of the rods 28,(40) in this example are straight and terminate in magnetic sockets 22 which are concentric with the axes of the rods. The rods are attached to the ball 14,(42) with their axes aligned with the centre of the ball.

Each of the measuring bars 16 have angled sockets 60 similar to those illustrated in FIG. 6 which enable the measuring bars to be attached to the ball 14,(42) with the axes of the bars passing through the centre of the ball. Magnets 62 are provided in the sockets to hold the bars in place. The sockets are positioned on the ball to enable the maximum freedom for pivoting movement of the measuring bars without interference as the two triangular frames are moved relative to one another on the machine being calibrated.

Figure 8:
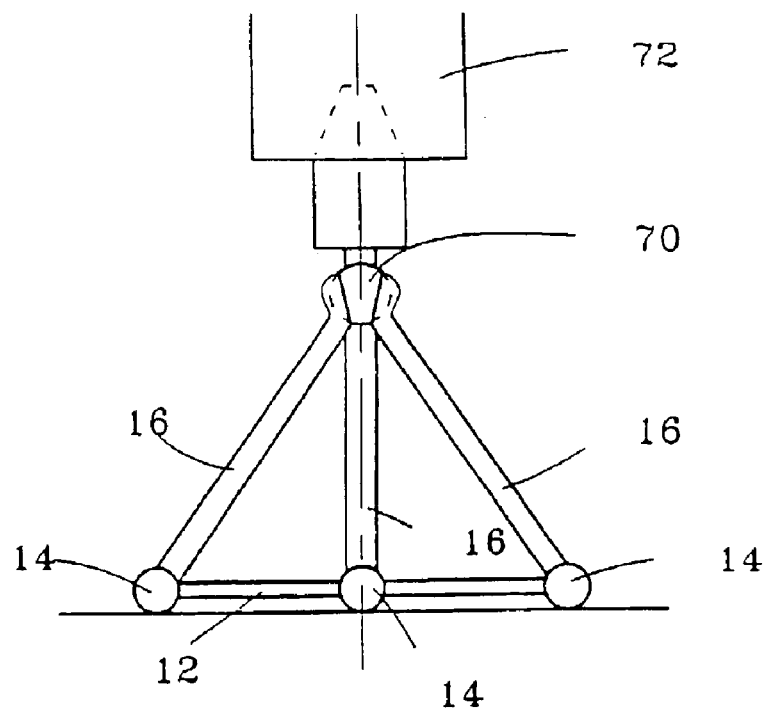
FIG. 8 shows a further embodiment of the invention.
Figure 9:
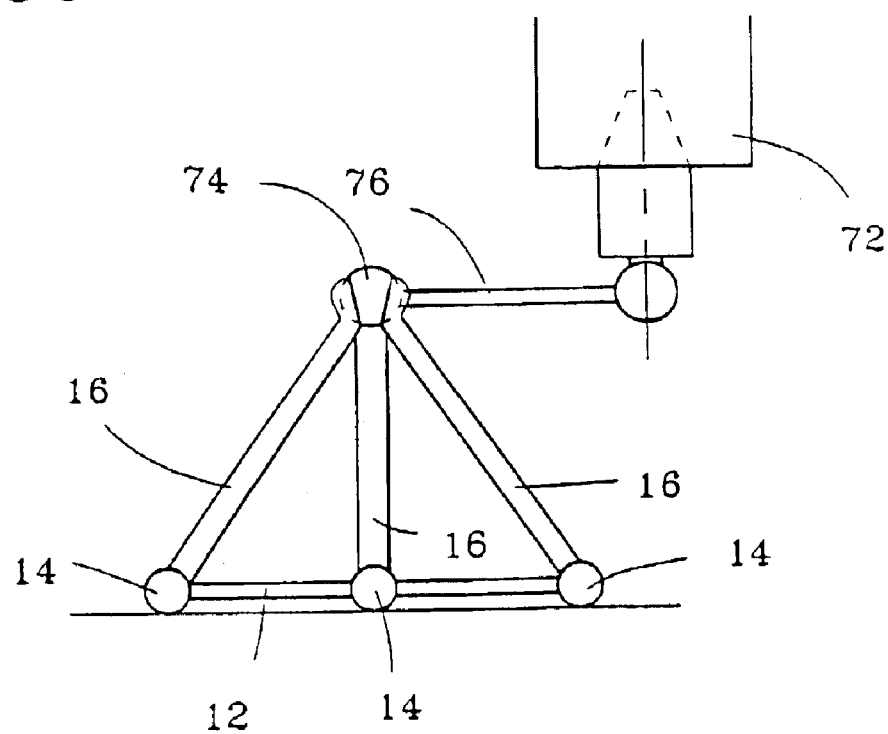
FIG. 9 shows a modification to the embodiment of FIG. 8.

In accordance with another novel aspect of the invention shown in FIGS. 8 and 9, the arrangement of FIG. 1 may be simplified. In place of an upper structure having three balls 14, the structure may consist of a single ball 70. This should be mounted on the moving structure of the machine and where this is the spindle 72, it should be located in exactly the same position as will be occupied by the operative point of the tool which is to be used. For example, this may be at the location of the cutting point of a cutting tool, or at the location of a stylus tip of a contact sensing probe. The lower frame 12 remains as in FIG. 1, and a total of three measuring bars 16 are used. Each measuring bar is fitted between the single ball on the moving structure, and a respective one of the balls 14 of the frame 12. The machine is then exercised and calibration data acquired in the same way as previously. However, with only three measurements available, it is only possible to determine the spatial position of the ball on the moving structure, and not the orientation of the moving structure. That is the reason why it is necessary to mount the ball on the moving structure at the same location as the operative point of the tool.

In order to obtain information on roll, pitch and yaw of the moving structure, a single ball 74 may be mounted on the moving structure by means of an extension 76 which extends laterally from the operative point of the tool (see ball 70 in FIG. 8) so that the single ball 74 is offset from this point as shown in FIG. 9. The lower frame and measuring bars are connected to the fixed structure as shown in FIG. 8.

One method of obtaining the roll, pitch and yaw data is to calibrate the machine by performing a first calibration routine with the frame 12 and single ball 70 connected as shown in FIG. 8, and then leaving the frame 12 in the same position, substituting the extension as shown in FIG. 9 and repeating the calibration routine. Any difference in the results will indicate the roll, pitch and yaw data.

FIGS. 10 to 14 illustrate another embodiment of the invention in which the apparatus is capable of being used as a machine tool, a robot or a measuring machine for positioning a tool or probe relative to a workpiece. For this purpose the measuring bars are replaced by powered struts which may themselves incorporate measuring devices. In this embodiment both of the upper and lower structures are triangular and carry three supports.

Such powered struts are themselves known, per se and are not described in detail. They may, for example be telescopic with internal drive mechanisms as illustrated in International Patent Application WO91/03145, or they may pass through the triangular support, or have extensions which do so, and be driven internally, as shown in International Patent Application No. WO92/17313, or externally as shown in FIG. 4 of our International Patent Application PCT/GB94/02593. One novel feature of the present invention lies in the manner in which the struts are connected to the triangular structures so as to allow for accurate measurement of the lengths of the struts.

Figure 10:
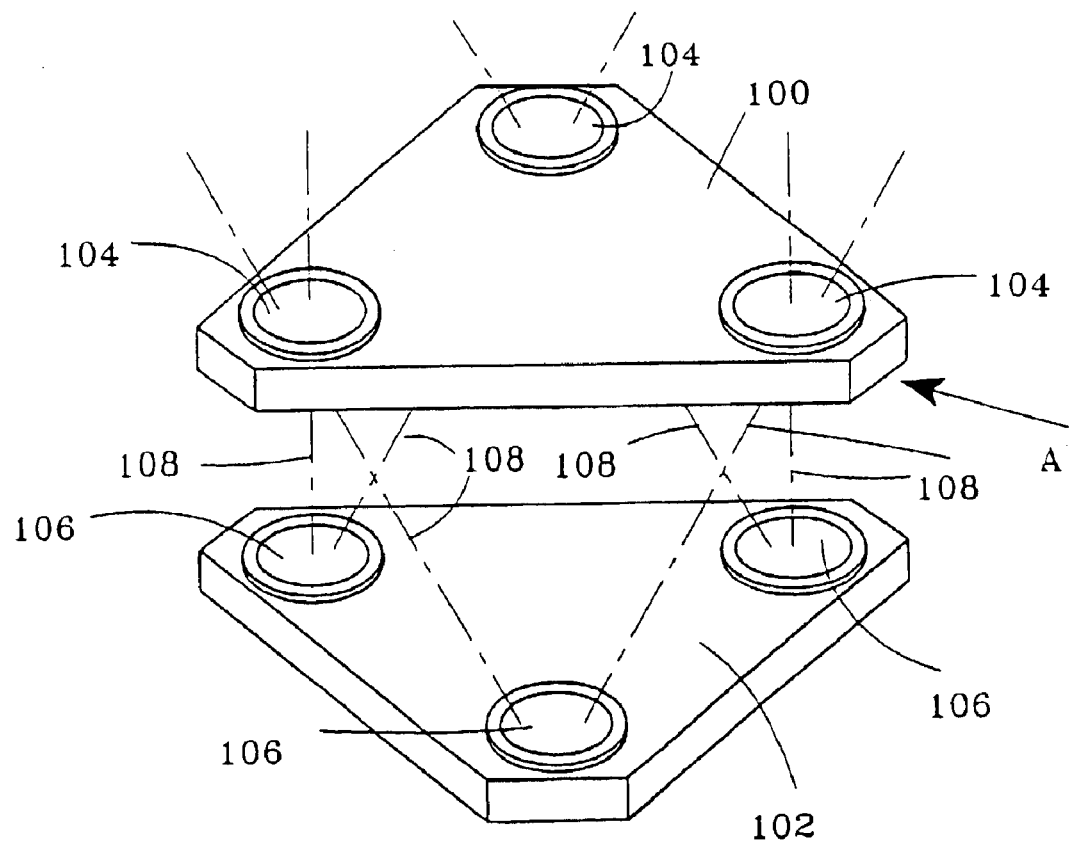
FIG. 10 shows an alternative embodiment of apparatus according to the invention.

FIG. 10 shows diagrammatically one example of the construction of the triangular structures. In this example the top and bottom structures 100,102 respectively are rigid solid or fabricated triangular structures having spherical sockets 104,106 respectively at each apex thereof. The spherical sockets replace the balls described in the previous embodiments (although balls could be used) in order to simplify the construction of the machine.

The two triangular structures 100,102 are interconnected by six powered struts 108 as indicated by the broken lines. It can be seen that two struts are connected to each of the sockets 104,106. The manner in which the struts are connected to the sockets is illustrated in FIGS. 11 to 14.

Figure 11:
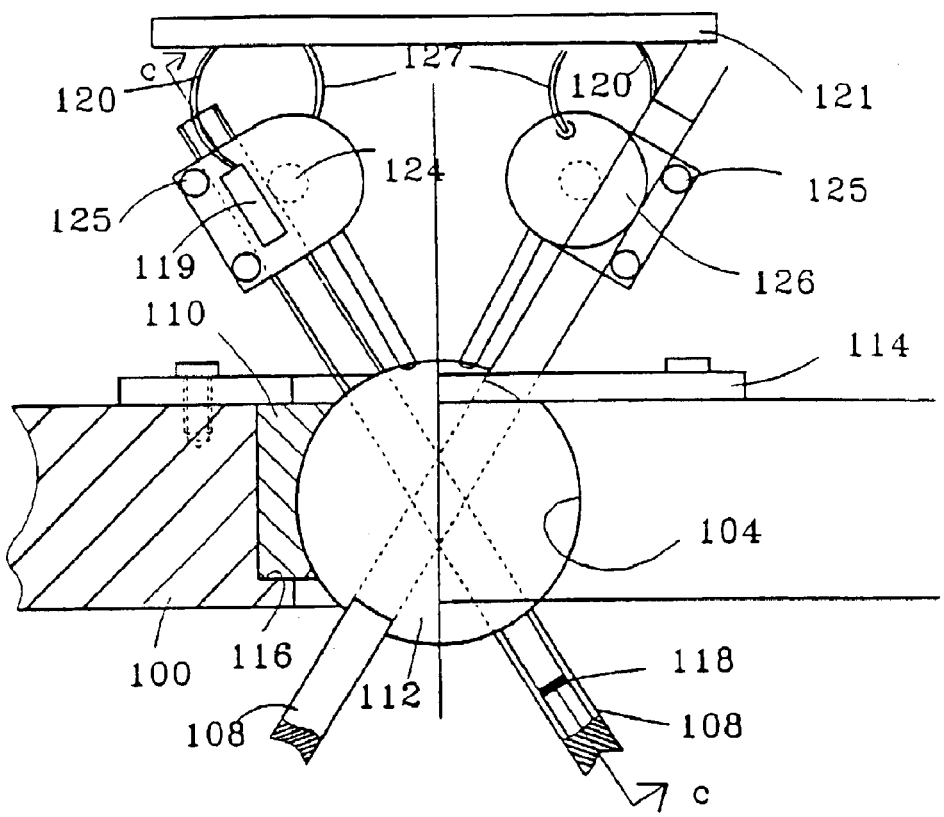
FIG. 11 is a part-sectional view in the direction of arrow A of FIG. 10 showing detail of the attachment of two powered struts to the structure.
Figure 12:
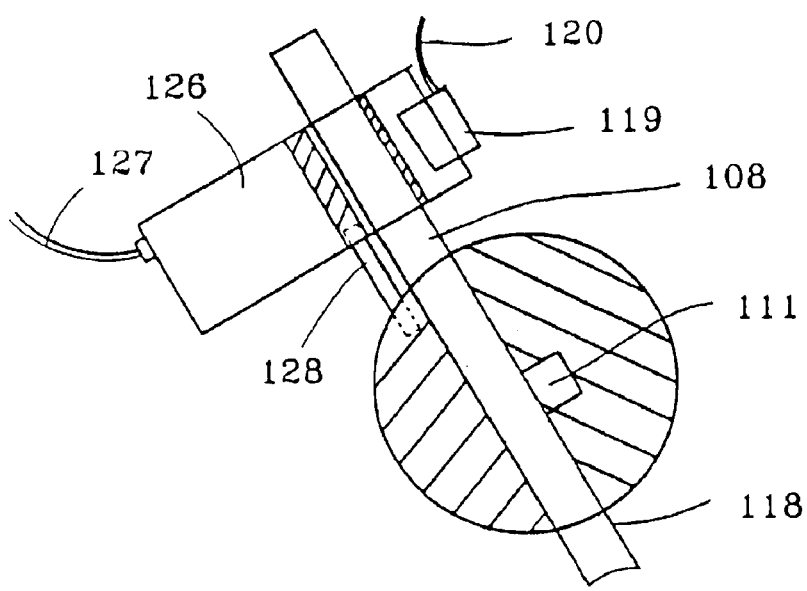
FIG. 12 is a section on line C—C of FIG. 11.
Figure 13:
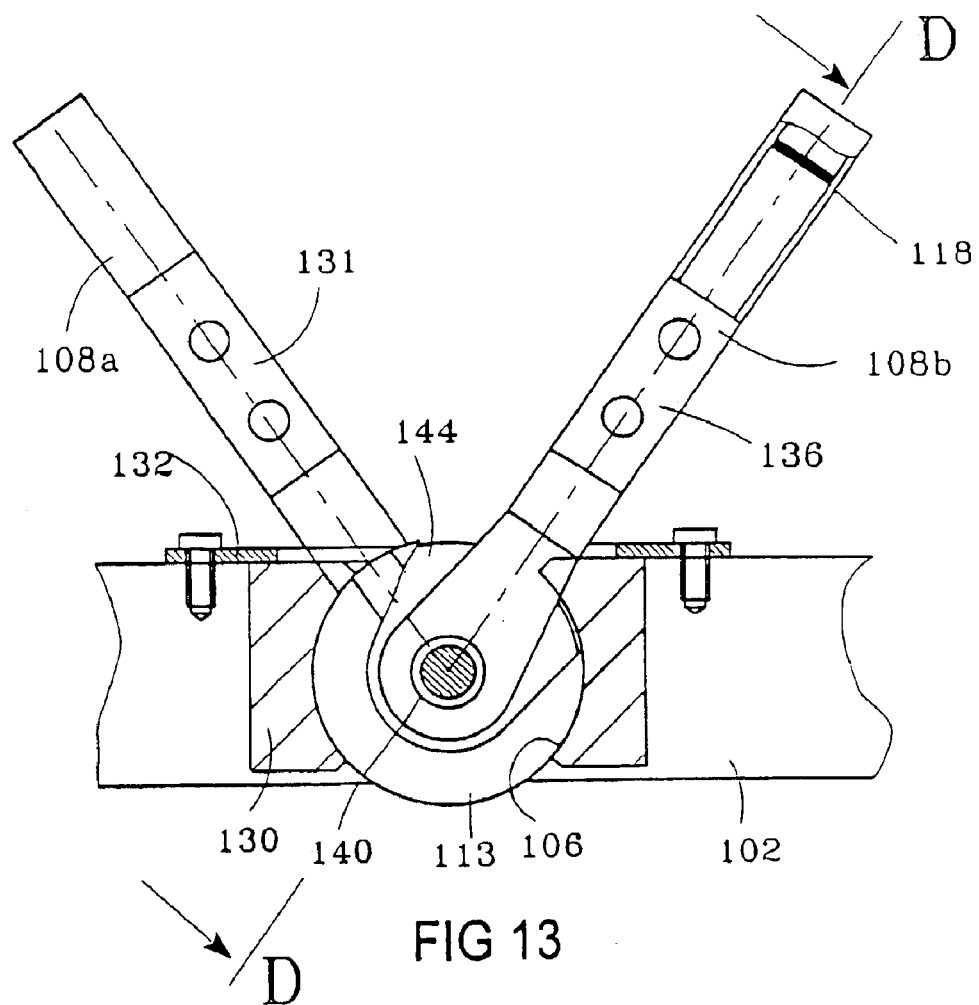
FIG. 13 is a part-sectional view in the direction of arrow B of FIG. 10 showing detail of an alternative attachment of two powered struts to the structure.
Figure 14:
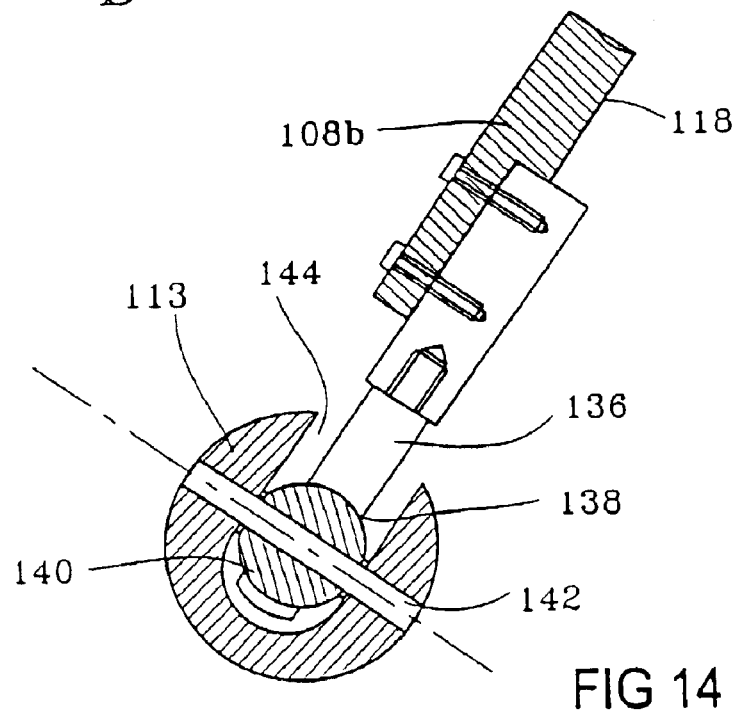
FIG. 14 is a section on the lines D—D of FIG. 13.

FIGS. 11 and 12 show details of the connection of two struts to a ball 112 at one of the sockets 104 in the top triangular structure 100, and FIGS. 13 and 14 show details of the connection of the other ends of the struts to a ball 113 at one of the sockets 106 in the bottom structure 102.

Referring now to FIGS. 11 and 12, it can be seen that the spherical socket 104 is formed in a cylindrical insert 110 which is split for ease of assembly, and supports a split ball bearing 112. The insert is secured in the structure 100 by a clamping plate 114 which clamps it against a ledge 116 in an aperture in the structure.

The struts 108 which may be square in cross-section (or have extensions which are of square cross-section), pass through apertures 111 in the split ball bearing 112, and are arranged so that one side of each strut (or extension) lies on the centre-line of the ball bearing. This flat surface, in this example, carries a scale indicated in part at 118 which is read by a readhead 119, which may be opto-electronic or other convenient type, to determine the change in length of the strut. The scale readings are passed via cables 120 to a computer 121 programmed with appropriate algorithms known per se, in order to determine the relative positions of the balls 112 from the lengths of the struts at any instant.

Because the scale lies on the centre line of the ball bearing, its change in length can be more accurately associated with any change in the distance between the centre of the ball bearing 112 in structure 100, and the centre of the ball bearing 113 (described below) in structure 102, as the two structures move relative to each other.

The struts in this example are driven by capstan drives at the ends of the struts outside the working volume of the machine. The capstan drive comprises a drive roller 124 and a pair of pinch rollers 125 between which the strut is gripped. Each drive roller 124 is driven by a motor 126 powered via cables 127 from an external source which may also be controlled by the computer 121. The readheads 119 are mounted on the motor casing and this in turn is rigidly connected to the split ball 112 by a rod 128 so as to rotate with the ball while allowing relative movement between the scale on the strut and the readhead.

The struts in this embodiment are not telescopic or extensible but are of fixed length. Because they extend through the ball and out beyond the structure 100, they allow for greater relative movements between structures 100 and 102 than if they were telescopic struts confined within the working volume of the machine.

Referring now to FIGS. 13 and 14 the connection of the opposite end of each strut to the socket 106 in structure 102 will be described.

As described with reference to socket 104, the socket 106 is formed in a split cylindrical insert 130 clamped in position by a plate 132. The cylindrical insert has a spherical internal surface to support the ball bearing 113 which is rigidly connected to an extension 131 on the end of a first one of the struts 108a. This allows for universal pivoting motion of the first strut 108a about the centre of the socket 106.

The second strut 108b has rigidly connected to its end an extension 136 having an aperture therein with a spherical internal surface 138. This surface is supported on the spherical outer surface of a bearing element 140 carried by a gudgeon pin 142 which passes through the spherical bearing 134. This allows the strut 108b to be unaffected by pivoting of the strut 108a.

The bearing 113 is cut away to provide a slot 144 to receive the extension 136 and to allow a range of pivoting movement of the strut 108 about the axis of the gudgeon pin 142. Because the gudgeon pin 142 passes through the centre of the ball bearing 134 the strut is also able to pivot independently about an orthogonal axis of the ball bearing 113.

The extensions 131 and 136 of the struts 108a and 108b respectively are arranged so that the surface which carries the scale 118 of each strut is aligned with the centre of the ball 113 while at the same time the axis of each extension passes through the centre of the ball.

It is to be understood that the connections of the two ends of the struts 108 at the sockets 104,106 in the two structures 100,102 are necessarily different in this example where the struts are of fixed length and have external drives.

Where the struts are telescopic or extensible in other ways and have internal drives as described in the International Patent Applications referenced above, both ends of the struts could be connected as described with reference to FIGS. 13 and 14. Other methods of connecting the struts 108 to the structures 100,102 may of course be used along with other types of drive.

Other types of measuring transducers could be used and disposed either internally or externally of the struts.

It is also to be understood that the different types of connections between struts and sockets, or measuring bars and balls are not essential or unique to the embodiments in which they are described, but may in appropriate cases be interchanged between different embodiments.

Where the measuring bars alone are used relatively light magnetic forces may be utilized to maintain the bars in position on the balls. Where, however, a magnetic ball and socket arrangement is used to connect a driven strut to a plate or structure, the magnets will need to be sufficiently powerful to prevent detachment of the strut from its support. In such circumstances, or in fact, in any of the ball and socket embodiments, the ball and socket joint may be fed with air to produce an air bearing effect to minimise friction.

It is also to be understood that a computer would be used to handle the data coming from the transducers in the passive measuring bars although one has not been specifically identified in these embodiments.

Other features of the embodiments of FIGS. 10 to 14 can also be read across to the embodiments of FIGS. 1 to 9.

For example, to improve the amount of relative movement between the frames of the calibration device, the telescopic measuring bars 16 could be replaced by measuring bars of fixed length which pass through the balls 14 in similar manner to that illustrated for the powered struts in FIGS. 11 and 12.

What is claimed is:

1. A machine, comprising:

a pair of spaced structures;

six struts interconnecting the structures;

six ball and socket joints, three spaced in a triangular array on each structure, each strut engaging at points spaced along its length with a respective ball and socket joint on each of the structures, the spacing between said points defining a variable distance between the centers of the ball and socket joints to which the strut is connected, wherein two struts are connected to each ball and socket joint, the struts extending through the ball and socket joints on one of the structures; and measuring devices are provided for determining distances between the centers of the ball and socket joints.

2. The machine according to claim 1, wherein each measuring device comprises a scale which is read by a readhead.

3. The machine according to claim 2, wherein each said strut or an extension thereof includes a flat surface at least in the region which passes through the ball and socket joint and on which the scale is provided.

4. The machine according to claim 3, wherein each said strut, or extension thereof, is arranged so that the scale lies on a center line of the ball and socket joint, while at the same time a longitudinal axis of the flat surface of each said strut or extension thereof passes through the center of the ball and socket joint.

5. The machine according to claim 1, wherein the spaced structures define a working volume of the machine and drive motors for the struts are provided on ends of the struts which lie outside the working volume of the machine.

6. A machine, comprising:

a pair of spaced structures, movable relative to each other;

six ball and socket joints, three spaced in a triangular array on each structure; and six struts interconnecting the structures, each strut engaging with a respective ball and socket joint on each of the structures and defining a variable distance between the centers of the ball and socket joints to which the strut is connected, wherein two struts are connected to each ball and socket joint, and each ball and socket joint comprises a socket on each respective strut, co-operating with a sphere, the sockets each comprising three engagement elements biased into engagement with the sphere and remaining engaged therewith during relative movement of the structures.

7. The machine according to claim 6, wherein each ball and socket joint includes a magnet which biases the engagement elements into engagement with the sphere.

8. The machine according to claim 6, wherein the sphere is unitary.

* * * * *